June 10, 1924.
J. G. BOOTON
1,497,206
REGULATING VALVE CONTROL FOR INTERNAL COMBUSTION ENGINES
Filed Dec. 23, 1919
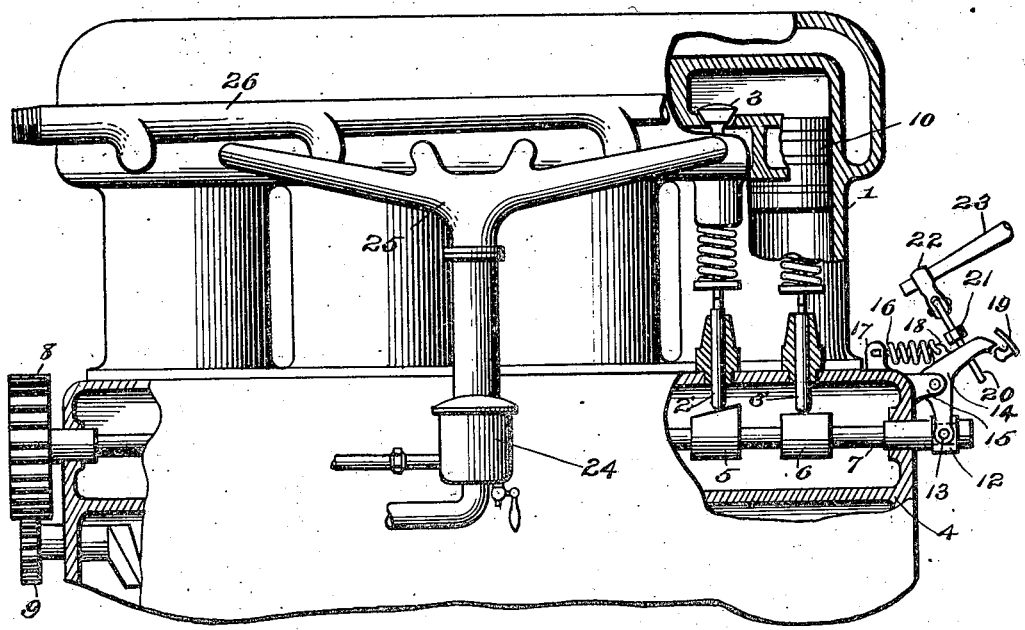
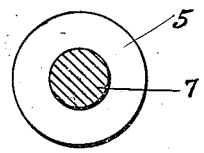
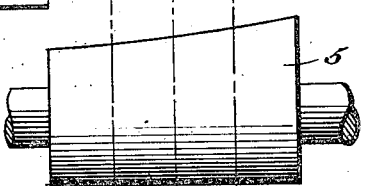
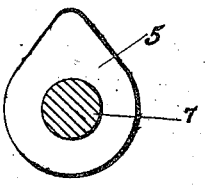
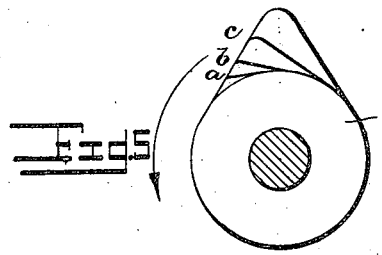
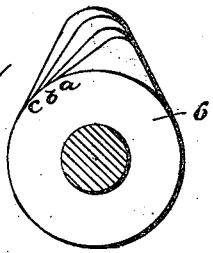
Inventor
John G Booton Patented June 10, 1924.

1,497,206

UNITED STATES PATENT OFFICE.

JOHN G. BOOTON, OF THE UNITED STATES ARMY.

REGULATING VALVE CONTROL FOR INTERNAL-COMBUSTION ENGINES.

Application filed December 23, 1919. Serial No. 346,977.

*To all whom it may concern:*

Be it known that I, JOHN G. BOOTON, Lt. Col., Ordnance Dept., U. S. A., a citizen of the United States, stationed at Washington, D. C., have invented an Improvement in Regulating Valve Control for Internal-Combustion Engines, of which the following is a specification.

This invention relates to means for improving the operation of internal combustion engines that are employed in such a way as to require only a portion of their maximum power and velocity of rotation during the greater part of the time of operation.

The usual internal combustion engine is provided with a throttle in the intake manifold and the charge delivered to the cylinders is governed by the partial vacuum between the throttle and the cylinders. The result of this method of regulation can be shown when the throttle is partially closed, to be as follows:—

The suction of the cylinders on the intake stroke produces a partial vacuum in the intake manifold. At the beginning of an intake stroke the exhaust valve is closed, the space in the cylinder above the piston is filled with the products of combustion at about atmospheric pressure. At this point the piston begins its downward movement and the intake valve opens. As the pressure in the intake manifold is much lower than the pressure in the cylinder, the products of combustion move past the intake valve into the intake manifold and mix with the inflammable mixture. This continues until the piston has moved to a point where the pressure in the cylinder is lower than that in the manifold when the motion of the gases is reversed and first some of the products of combustion and then some inflammable mixture is drawn in. It can be seen that this will be late in the downward stroke of the piston and that the flow from the manifold to the cylinder will continue until the intake valve closes, which in usual practice, is from 30° to 40° of revolution of the crank shaft after the piston has started its return stroke. When the throttle is nearly closed the manifold charge will be introduced from about the time the piston reaches bottom center until the intake valve closes on the upward stroke.

It is proposed by this invention to eliminate the throttle, so that the pressure in the intake manifold will be practically that of the atmosphere and to control the intake valve so that it will open as the piston starts downward and close as soon as the required charge is taken in, the advantages being, that as no sustained vacuum is created in the intake manifold there will be much less tendency for vaporized liquid fuel to condense in the manifold due to the rarefication and cooling of the explosive mixture, and that the charge will be in the cylinder from near the beginning of the intake stroke of the piston, so that it will be heated from about 20° revolution of the crank shaft after the piston has reached top center to about 30° before reaching the top center on the compression stroke, which is about the point at which the spark occurs. In the proposed valve action, the greater part of the explosive charge will be in the cylinder for about 310° of the revolution of the crank shaft, whereas in the usual engine it is in the cylinder for about 150° of revolution of the crank shaft. The mixture therefore will be in the cylinder over twice as long and due to the heat absorbed from the cylinder walls will be in much better condition for burning. As more power is needed, the intake valve will be opened wider and for a longer time.

It is further proposed to control the exhaust valve so that when using small charges it will open about 10° before bottom center of the power stroke and close about 10° after top center of the exhaust stroke and as larger charges are used to advance the opening so that when full charges are used the valve will open about 40° before bottom center. With small charges the early opening of the exhaust valve is not needed on account of the small volume of gas, so it is proposed to make use of the expansive power remaining in the gas and what is more important, to keep the gases in the cylinder as long as possible so that more of their heat may be absorbed by the cylinder walls.

In the following specification reference is made to the accompanying drawings illustrative of the preferred embodiment for accomplishing my invention.

Figure 1 is a side elevation of an internal combustion engine with parts broken away to show the application of my invention to an inlet valve and the stem of an exhaust valve.

Figure 2 is a side elevation of an inlet cam.

Figure 3 is an end view of the small end of the cam showing the cam shaft in section.

Figure 4 is an end view of a large end of the cam showing the cam shaft in section.

Figure 5 is an end view with parts in section showing the relative form of the intake cam at the successive sections taken on the lines a—a, b—b and c—c of Figure 2.

Figure 6 is an end view with the cam shaft in section, showing the relative form of the exhaust cam on successive sections corresponding to the lines a—a, b—b and c—c of Fig. 2.

The numeral 1 designates the cylinder of an internal combustion engine having the usual inlet valve 3 and the exhaust valve, not shown. The stems of the inlet and exhaust valves are urged downwardly by the usual valve springs for operative engagement with the valve tappets 2', 3' which pass through appropriate bushings in the crank case 4 for coacting with the inlet cam 5 and exhaust cam 6 carried by the cam shaft 7. The cam shaft 7 is rotatably mounted in bearings carried by the crank-case and is capable of longitudinal sliding movement in these bearings. Shaft 7 carries at one end a spur-gear 8 meshing with a gear 9 secured to the crank shaft.

The face of the gear 8 is made wider than that of the spur gear 9 so that the two gears will remain in mesh at all operative positions of the cam shaft. If spiral gears or a chain drive is used instead of spur gears, it is proposed to make the cam shaft gear of the usual width and to provide it with a square or splined central hole into which the square or splined end of the cam shaft is fitted, so that the cam shaft may have endwise motion with respect to the gear and at the same time be rotated by the gear. The end of the cam shaft opposite the gear 8 is provided with a circumferential groove into which is fitted a sleeve 12 having projecting pins 13 for engaging the forked ends of a foot lever 14. The lever 14 is pivoted to an ear 15 secured to the crank case and is retained in normal position by means of a tension spring 16 connected to a lug 17 formed on the crank case and to an eye formed in a lug 18 on the lever. The foot lever 14 is longitudinally slotted for the reception of a rod 20 on which is adjustably mounted the nut 21.

The rod 20 is pivotally secured to an arm 22 mounted for rotation with the shaft 23 which is controlled by a lever adapted to be operated by hand. The pedal 19 of the foot lever is disposed for convenient operation of the operator of the engine or motor vehicle.

The inlet ports of the multi-cylinder engine are connected to the carbureter 24 by the intake manifold 25, while the exhaust ports connect to a common exhaust pipe 26.

Figure 2 shows a view of the intake cam, and it will be understood that the exhaust cam is disposed in different angular relation to the cam shaft in order to operate their respective valves at the proper periods in relation to the position of the piston 10. The inlet cam is of varying section as shown in Fig. 5 so as to begin to open the inlet valve at a certain point at all of its successive sections but to open the valve wider and for a longer period as the cam shaft is moved to the left. The exhaust cam 6 as shown in Fig. 6 is shaped so as to open the valve earlier and to a greater extent as the shaft 7 is moved to the left but all of the sections of the valve will permit the closing of the exhaust valve at the same place in relation to the position of the piston.

The operation is as follows:—

In case only a small amount of power is desired the cam shaft is moved by the tension spring 16 to the right bringing the smaller sections of both the intake and the exhaust cams into operation. Beginning with the intake stroke the piston starts down, the intake valve opens, the small charge needed is taken in, the intake valve closes, the charge is heated during the remainder of the intake stroke and until it is fired near the top of the compression stroke. The piston passes on to the top of the compression stroke and moves downward on the power stroke, the ignited charge driving the piston down and heating the piston and cylinder until near the end of the power stroke, when the exhaust valve opens releasing the charge which is forced out as the piston travels upward on the exhaust stroke. As more power is needed the cam shaft is moved to the left as shown on the drawing, bringing into operation sections of the intake cam which will raise the intake valve higher and keep it open longer and sections of the exhaust cam which will open the exhaust valve earlier and for a longer period and to a greater extent so as to exhaust the larger charges without undue back pressure on the piston.

It is believed that my invention, the scope of which is embraced in the appended claims, is new and useful, and as such is patentable under the revised statutes of the United States.

Having described my invention, what I claim as new and desire to secure by Letters Patent, is:—

The method of governing an internal combustion engine by operating the intake and exhaust valves so that for small charges the intake valve opens near the beginning of the intake stroke of the piston and closes as soon as the desired charge is admitted and the exhaust valve opens near the end of the power stroke of the piston, and for larger charges the intake valve opens wider and for a longer time and the exhaust valve opens earlier so as to exhaust the larger volume of gases without undue back pressure.

JOHN G. BOOTON.